US 6,911,261 B2

(12) United States Patent
Jensen et al.

(10) Patent No.: US 6,911,261 B2
(45) Date of Patent: Jun. 28, 2005

(54) PH ADJUSTMENT OF A MELT FOR USE IN MICROETCHING GLASS SUBSTRATES

(75) Inventors: Terry Lee Jensen, Rochester, MN (US); John William Marier, Byron, MN (US); Douglas Howard Piltingsrud, Eyota, MN (US); Rick Allan Sprague, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 10/170,806

(22) Filed: Jun. 13, 2002

(65) Prior Publication Data

US 2003/0230552 A1 Dec. 18, 2003

(51) Int. Cl.$^7$ .............................. B05D 1/18; C23F 1/00
(52) U.S. Cl. ..................... 428/410; 428/426; 216/97; 216/31
(58) Field of Search .............................. 216/31, 37, 96, 216/97, 98; 428/410, 426, 58; 427/431, 443.2; 65/30.14

(56) References Cited

U.S. PATENT DOCUMENTS

| | | | |
|---|---|---|---|
| 4,803,106 A | 2/1989 | Lenhart et al. | 428/64 |
| 5,733,622 A | 3/1998 | Starcke et al. | 428/64.1 |
| 6,114,039 A | 9/2000 | Rifqi | 428/410 |
| 6,236,542 B1 | 5/2001 | Hartog et al. | 360/136 |
| 6,595,028 B1 | 7/2003 | Miyamoto et al. | |

FOREIGN PATENT DOCUMENTS

| | | |
|---|---|---|
| CN | 1044448 A | 8/1990 |
| JP | 54118417 A2 | 9/1979 |
| JP | 2001167427 A2 | 6/2001 |

OTHER PUBLICATIONS

U.S. Appl. No. 10/024,693, "PH Adjustment of a Strengthening Melt for use in Strengthering Glass Substrates", Terry L. Jensen et al., filed Dec. 18, 2001.
U.S. Appl. No. 09/976,167, "Self–Cleaning Colloidal Slurry Composition and Process for Finishing a Surface of a Substrate", James A. Hagan et al., filed Oct. 12, 2001.
U.S. Appl. No. 09/976,412, "Cleaning Polish Etch Composition and Process for a Superfinished Surface of a Substrate", James A. Hagan et al., filed Oct. 12, 2001.

Primary Examiner—Parviz Hassanzadeh
(74) Attorney, Agent, or Firm—Matthew J. Bussan

(57) ABSTRACT

A method of adjusting the pH of a strengthening melt to provide an adjusted melt for use in microetching glass substrates, such as glass disk substrates for use in data storage devices. A base is added to the strengthening melt to raise its pH. A desired degree of microetch is provided on an aluminosilicate glass disk substrate, for example, by immersion for 2–4 hours at 360° C. in a melt adjusted to have a pH of 10. This single operation both strengthens and microetches the glass substrate. A slight etching of the surface of a glass substrate, i.e., microetching, improves the performance and durability of a data storage disk made from the substrate. To avoid an overly aggressive etch that can create undesirable damage to the substrate surface, an acid may be added to the melt if the pH is subsequently determined to have shifted to above an upper limit.

20 Claims, 3 Drawing Sheets

PH ADJUSTMENT OF A MELT FOR USE IN MICROETCHING GLASS SUBSTRATES

CROSS-REFERENCE TO RELATED APPLICATION

This patent application is related to copending application Ser. No. 10/024,693, filed Dec. 18, 2001, entitled "PH ADJUSTMENT OF A STRENGTHENING MELT FOR USE IN STRENGTHENING GLASS SUBSTRATES", which is assigned to the assignee of the instant application.

FIELD OF THE INVENTION

The present invention relates in general to microetching glass substrates. More particularly, the present invention relates to a method of adjusting the pH of a strengthening melt to provide an adjusted melt for use in microetching glass substrates, such as glass disk substrates for use in data storage devices.

BACKGROUND

A typical data storage device includes a medium for storing data, typically in magnetic, magneto-optical or optical form, and a transducer used to write and read data respectively to and from the medium. A disk drive data storage device, for example, includes one or more data storage disks coaxially mounted on a hub of a spindle motor. The spindle motor rotates the data storage disks at speeds typically on the order of several thousand or more revolutions-per-minute. Digital information, representing various types of data, is typically written to and read from the data storage disks by one or more transducers, or read/write heads, which are mounted to an actuator assembly and passed over the surface of the rapidly rotating disks.

In a typical magnetic disk drive, for example, data is stored on a magnetic layer coated on a disk substrate. Several characteristics of disk substrates significantly affect the areal density of a disk drive. One such characteristic that significantly affects the areal density of a disk drive is the uniformity of the surface of the disk substrate, i.e., the absence of substrate surface defects. It is generally recognized that minimizing the flyheight, i.e., the clearance distance between the read/write head and the surface of a data storage disk, generally provides for increased areal densities. It is also recognized in the art, however, that the smoothness of the surface of a data storage disk becomes a critical factor and design constraint when attempting to minimize the flyheight. A significant decrease in flyheight provided by the use of data storage disks having highly uniform recording surfaces can advantageously result in increased transducer readback sensitivity and increased areal density of the disk drive. The uniformity of disk substrate surfaces affects the uniformity of the recording surfaces because the layers sputtered onto the disk substrate, such as the magnetic layer, replicate any irregular surface morphology of the disk substrate.

Conventionally, disk substrates have been based upon aluminum, such as NiP coated Al/Mg alloy substrates. Coating the aluminum magnesium alloy with a nickel-phosphorus plate provides a harder exterior surface which allows the disk substrate to be polished and superfinished. A conventional superfinishing process and slurry is described in U.S. Pat. No. 6,236,542 to Hartog et al., which is assigned to the assignee of the present application. Typically, the Al/Mg—NiP substrate is superfinished to a smooth finish with a colloidal slurry, e.g., a pH adjusted aqueous slurry containing colloidal silica and/or colloidal alumina particles and an etching agent such as a nitrate, prior to sputtering with thin film magnetic coatings. The colloidal slurry is then cleaned from the substrate by the general cleaning mechanisms of mechanical scrubbing, dispersion and etching. Surfactants and pH are generally used for dispersion cleaning, where the surfactant and pH act to separate the slurry particles from each other and from the substrate. Etching is generally accomplished by acids and acid soaps that erode or dissolve the substrate material beneath embedded slurry particles (under-cut) to release them from the substrate. Typical acids in use for NiP plated Al-based substrates include, for example, straight phosphoric acid, nitric acid, hydrofluoric acid-based soaps and phosphoric acid-based soaps. The straight acids generally have a pH less than 1 and the soaps generally have pH's above 1.

After cleaning, the substrates are sputtered with a series of layers, e.g., a chrome underlayer, a magnetic layer and a carbon protection layer. If residual slurry particles are left on the substrate or there is galling to the relatively soft NiP layer, the sputtered layers replicate the irregular surface morphology, creating a bumpy surface on the finished disk. When the read/write head glides over the surface, it crashes into bumps created by the residual particles and/or damage that is higher than the glide clearance. This is known as a glide defect, which can ultimately cause disk drive failure. These bumps further cause magnetic defects, corrosion and decreased disk life. Thus, the residual slurry particles and/or damage needs to be removed from the polished substrate surface so that the substrate is as smooth as possible.

Unfortunately, aluminum-based substrates have relatively low specific stiffness, as well as relatively low impact and dent resistance. For example, the relatively low specific stiffness of the Al/Mg—NiP substrates (typically 3.8 Mpsi/gm/cc) makes this type of disk substrate susceptible to environmental forces which create disk flutter and vibration and which may cause the read/write head to impact and dent the disk substrate surface.

More recently, glass substrates have been used for disk drives in portable devices, such as laptop computers. Glass substrates have a higher impact and dent resistance than aluminum-based substrates, which is important in portable devices where the unit is subject to being bumped, dropped and banged around, causing the read/write head to bang on the disk substrate surface. As discussed in more detail below, glass substrates are typically strengthened by immersion in a strengthening melt. Moreover, the specific stiffness of glass substrates (typically $\leq 6$ or 7 Mpsi/gm/cc) is typically higher than that of aluminum-based substrates.

An additional benefit of glass is that it is easier to polish to and maintain as a smooth surface finish (as compared to NiP) than aluminum-based substrates. A smoother substrate allows the read/write head to fly closer to the disk, which produces a higher density recording. Glide height for some computer disk drives is on the order of 20 nanometers (about 200 Å) and less, which is an extremely small interface distance. Thus, the fact that glass substrates can be polished to smoother finishes makes an industry shift from Al-based substrates to glass substrates desirable, not only for disk drives used in portable devices, but for disk drives used in stationary devices as well.

Just as with aluminum-based substrates, the surface of the glass substrate needs to be polished and superfinished with a slurry to provide an atomically smooth surface. Such a conventional superfinishing polish process and slurry is also described in the above referenced U.S. Pat. No. 6,236,542 to Hartog et al. Typically, the glass substrate is superfinished to a smooth finish with a colloidal slurry, e.g., a pH adjusted aqueous slurry containing colloidal silica and/or colloidal alumina particles and an etching agent such as cerium sulfate, prior to strengthening in a strengthening melt and sputtering with thin film magnetic coatings.

In this conventional superfinishing polish process colloidal silica particles attach to the surface being polished not only by the usual London dispersion forces, van der Waals forces and hydrogen bonding, but unlike NiP, also by molecular bonding even though the slurry has the usual stabilizing agents used in the colloidal silica to prevent the silica particles from sticking to each other (interparticle siloxane bonding), charge repulsion and/or steric stabilizers. Standard methods of scrubbing with soaps using polyvinyl alcohol (PVA) pads, ultrasonics or megasonics will not remove any significant percentage of such molecular bonded silica particles. Just as with aluminum-based substrates, if these particles are left in place on the glass substrate, glide defects occur that can ultimately cause disk drive failure. These glide defects further cause magnetic defects, corrosion and decreased disk life.

A less-than-optimal solution to this problem is to use stronger acid or base solutions than the cleaning soap, to etch the glass substrate or undercut the slurry particles similar to what can be done to remove hard alpha alumina from Al/Mg—NiP substrates after non-superfinish polish slurries. However, the surface finish of glass substrates can be damaged by such a technique through surface topography change such as pitting and chemical composition changes. Glass has low resistance to acid etching and overly aggressive acid solutions, such as hydrofluoric acid, and caustic etching at high pH's and temperatures. The damage to the superfinished glass surface may be sufficient enough to adversely affect the morphology of layers deposited by subsequent sputtering processes and can cause magnetic, glide and corrosion failures.

A better solution to this problem is to use a cleaning polish etch solution/process (a process performed by running disk substrates on a polishing pad using an etch solution instead of a slurry, i.e., there are no slurry particles in the cleaning polish etch solution) with acid, neutral or base solutions to etch the glass substrate and/or the attached slurry particles under polish conditions thereby maintaining the superfinish surface while removing the superfinish polish slurry debris by etching and dilution. Such a cleaning polish etch solution/process is disclosed in the copending application Ser. No. 09/976,412 entitled "CLEANING POLISH ETCH COMPOSITION AND PROCESS FOR A SUPERFINISHED SURFACE OF A SUBSTRATE", assigned to the same assignee as the present application. Etching by itself (i.e., the first solution discussed above) with PVA scrub, ultrasonics or megasonics is what has been done to remove slurry particles from Al/Mg—NiP or glass substrates, but with the less than 20 nm glide heights now in use, a cleaning polish etch solution/process ensures 100% surface cleaning of particles that small (i.e., the lower the glide height, the smaller the particles needing to be removed, and thus the more difficult they are to remove) while maintaining the surface finish. The cleaning polish etch process, however, adds equipment and handling costs. Nonetheless, without the cleaning polish etch process the surface of the glass substrate can be damaged by using only chemical etch due to the low resistance of the glass material to acid etching or overly aggressive caustic etch solutions.

An even better solution to this problem is to use a self-cleaning colloidal slurry and process, such as disclosed in the copending application Ser. No. 09/976,167 entitled "SELF-CLEANING COLLOIDAL SLURRY COMPOSITION AND PROCESS FOR FINISHING A SURFACE OF A SUBSTRATE", assigned to the same assignee as the present application. The slurry comprises a carrying fluid, colloidal particles, etchant, and a surfactant adsorbed and/or precipitated onto a surface of the colloidal particles and/or substrate. The surfactant has a hydrophobic section that forms a steric hindrance barrier and substantially prevents contaminates, including colloidal particles, from bonding to the substrate surface. Subsequent cleaning with standard soap solutions removes substantially all remaining contamination from the substrate surface.

After cleaning, the glass substrate is typically subjected to chemical strengthening. Chemical strengthening is known in the art of treating glass. In chemical strengthening, the substrate is immersed in a strengthening melt, e.g., molten potassium nitrate and/or sodium nitrate, typically for at least 1 hour to strengthen the glass against breaking. In the strengthening melt, an ion exchange process strengthens the glass substrate by exchanging smaller ions near the substrate surface for larger ions of the strengthening melt below the transformation temperature of the glass to generate pressure stress zones at the substrate surface.

It is known that by slightly etching, or microetching, the surface of glass disk substrates, the performance and durability of data storage disks made therefrom can be improved. Microetching is conventionally accomplished by immersing the glass disk substrates in a strong acid bath, e.g., a hydrofluoric (HF) acid bath, typically after the substrates have been superfinished, cleaned and strengthened. Unfortunately, immersion of substrates in strong acid baths involves safety risks and additional process steps. Moreover, the surface finish of glass substrates can be damaged by techniques such as this that employ strong acid or base solutions. The damage can include surface topography change such as pitting and chemical composition changes. Glass has low resistance to acid etching and overly aggressive acid solutions, such as HF acid, and caustic etching at high pH's and temperatures. The damage to the superfinished glass surface may be sufficient enough to adversely affect the morphology of layers deposited by subsequent sputtering processes and can cause magnetic, glide and corrosion failures.

If the market trend toward glass substrates in disk drives is to succeed, an enhanced mechanism for microetching glass substrates is required. Preferably, such an enhanced mechanism would not involve additional process steps and safety risks. Also, such an enhanced mechanism would preferably not cause undesirable damage to a superfinished surface of a glass disk substrate.

SUMMARY OF THE INVENTION

An object of the present invention is to provide an enhanced mechanism for microetching glass substrates.

Another object of the present invention is to provide such an enhanced mechanism for microetching glass substrates that does not involve additional process steps and safety risks.

Yet another object of the present invention is to provide such an enhanced microetching mechanism that does not cause undesirable damage to a superfinished surface of a glass disk substrate.

These and other objects of the present invention are achieved by a method of adjusting the pH of a strengthening melt (e.g., molten potassium nitrate and/or sodium nitrate) to provide an adjusted melt for use in microetching glass substrates, such as glass disk substrates for use in data storage devices. A base (e.g., sodium hydroxide) is added to the strengthening melt to raise the pH to a level at which microetching occurs in aqueous solution for a given glass (e.g., a pH of about 9 to 11 for silicate glass). Preferably, a glass substrate is immersed in the adjusted melt for a time sufficient to provide a desired degree of microetch (e.g., about 1 to 24 or more hours for silicate glass) with the temperature of the adjusted melt being below the strain point, or transformation temperature, of the glass (e.g., about 280° C. to 420° C. for silicate glass in molten potassium nitrate and/or sodium nitrate). More preferably, the glass substrate is aluminosilicate, the adjusted melt has a pH of about 10, and the glass substrate is immersed in the adjusted melt for about 2 to 4 hours at about 360° C. This single immersion operation both strengthens and microetches the glass substrate, without additional process steps and safety concerns. A slight etching of the surface of a glass substrate, i.e., microetching, improves the performance and durability of a data storage disk made from the glass substrate. For glass disk substrates, it is generally preferred that the microetching produce an overall surface microroughness ($R_q$) within the range of about 5 Å to about 7 Å. To avoid an overly aggressive etch that can create undesirable damage to the substrate surface, an acid (e.g., nitric acid) may be added to the adjusted melt if the pH is subsequently determined to have shifted to above an upper limit (e.g., an upper pH limit of about 11 for silicate glass).

BRIEF DESCRIPTION OF THE DRAWINGS

The present invention together with the above and other objects and advantages can best be understood from the following detailed description of the embodiments of the invention illustrated in the drawings, wherein like reference numerals denote like elements.

DETAILED DESCRIPTION OF THE PREFERRED EMBODIMENTS

Overview

Figure 1:
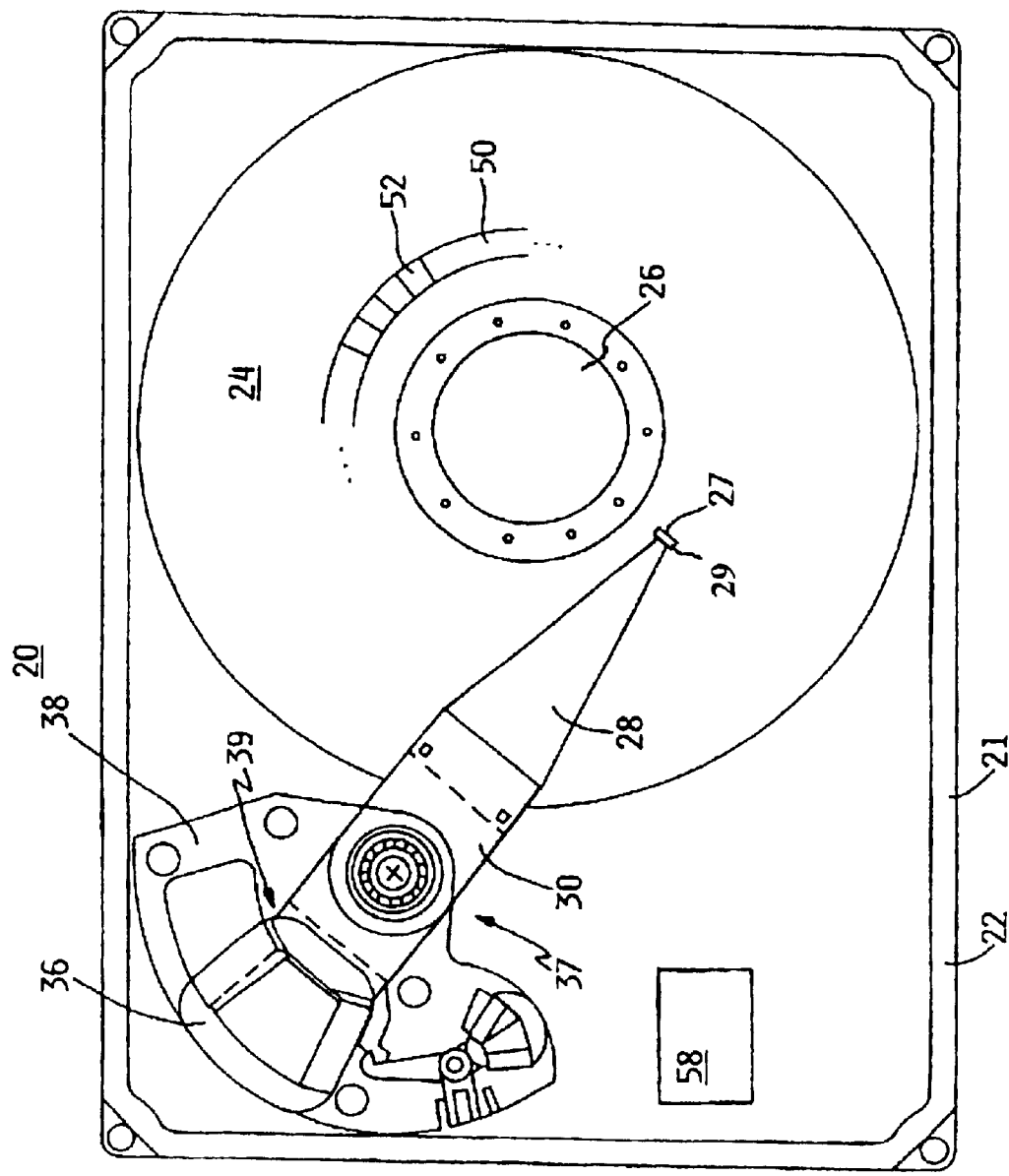
FIG. 1 is a top view of a data storage device with its upper housing cover removed and employing one or more data storage disks having glass disk substrates that have been microetched with a pH adjusted melt in accordance with the present invention.

The present invention utilizes a base to adjust the pH of a strengthening melt to provide an adjusted melt for use in microetching glass substrates, such as glass disk substrates for use in data storage devices. The strengthening melt may be molten potassium nitrate and/or sodium nitrate, for example. A base (e.g., sodium hydroxide) is added to the strengthening melt to raise the pH to a level at which microetching occurs in aqueous solution for a given glass (e.g., a pH of about 9 to 11 for silicate glass). Preferably, a glass substrate is immersed in the adjusted melt for a time sufficient to provide a desired degree of microetch (e.g., about 1 to 24 or more hours for silicate glass) while the temperature of the adjusted melt is maintained below the strain point, or transformation temperature, of the glass (e.g., about 280° C. to 420° C. for silicate glass in molten potassium nitrate and/or sodium nitrate). More preferably, the glass substrate is aluminosilicate, the adjusted melt has a pH of about 10, and the glass substrate is immersed in the adjusted melt for about 2 to 4 hours while the temperature is maintained at about 360° C. This single immersion operation both strengthens and microetches the glass substrate, without additional process steps and safety concerns. A slight etching of the surface of a glass substrate, i.e., microetching, improves the performance and durability of a data storage disk made from the glass substrate. For glass disk substrates, it is generally preferred that the microetching produce an overall surface microroughness ($R_q$) within the range of about 5 Å to about 7 Å. This degree of microetching typically adds aerodynamic stability to the head/disk interface, reducing slider modulation and head crashes, and improves off-track error rate. To avoid an overly aggressive etch that can create undesirable damage to the substrate surface, an acid (e.g., nitric acid) may be added to the adjusted melt if the pH is subsequently determined to have shifted to above an upper limit (e.g., an upper pH limit of about 11 for silicate glass).

In an exemplary embodiment that is described in greater detail below, an adjusted melt was made by adding sodium hydroxide to a conventional strengthening melt comprising potassium nitrate and sodium nitrate to raise the pH from an initial pH of 7.0 to an adjusted pH of 10.2. Superfinished aluminosilicate glass disk substrates were both strengthened and microetched by immersion in the pH adjusted melt (pH=10.2) at 360° C. for 3 hours. The surface microetch was uniform and free from high spots or peaks as seen by atomic force microscope (AFM). The overall (root mean square) surface microroughness ($R_q$) was 5.23 Å, the average height of peaks above average roughness ($R_p$) was 28 Å, and the difference between the highest peak and the lowest valley ($R_{max}$) was 45 Å. A data storage disk having improved performance and durability can be provided by applying a recording layer over the microetched surface of the aluminosilicate glass disk substrate treated with the pH adjusted melt (pH=10.2) as compared to the conventional strengthening melt (pH=7.0).

The Data Storage Device

Figure 2:
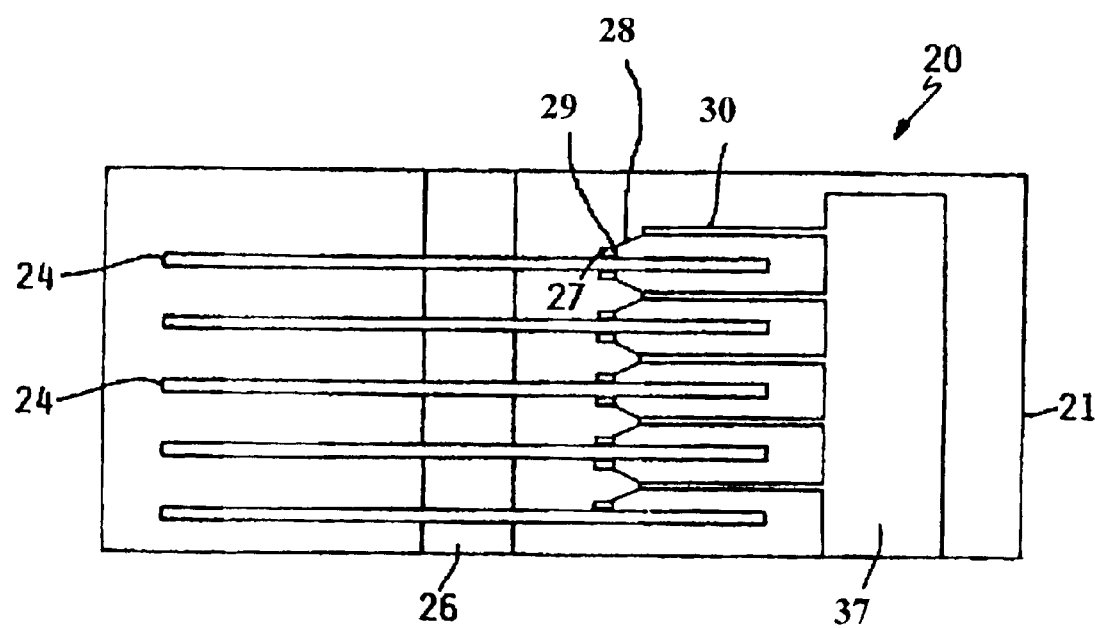
FIG. 2 is a side plan view of a data storage device comprising a plurality of data storage disks having glass disk substrates that have been microetched with a pH adjusted melt in accordance with the present invention.

Referring now to the drawings, and more particularly to FIGS. 1 and 2, there is shown a magnetic data storage device 20 utilizing magnetic disks with disk substrates that have been microetched using a pH adjusted melt in accordance with the preferred embodiment of the present invention. Magnetic data storage device 20 is shown in FIG. 1 with its cover (not shown) removed from a base 22 of a housing 21. As best seen in FIG. 2, the magnetic data storage device 20 includes one or more rigid data storage disks 24 that are rotated by a spindle motor 26. The rigid data storage disks 24 are constructed with a disk substrate upon which a recording layer is formed. In an exemplary construction, a magnetizable recording layer is formed on a glass disk substrate. Alternatively, an optical recording layer or a magneto-optical recording layer may be formed on the disk substrate in lieu of the magnetizable recording layer.

Referring back to FIG. 1, an actuator assembly 37 typically includes a plurality of interleaved actuator arms 30, with each arm having one or more suspensions 28 and transducers 27 mounted on airbearing sliders 29. The transducers 27 typically include components both for reading and writing information to and from the data storage disks 24. Each transducer 27 may be, for example, a magnetoresistive (MR) head having a write element and a MR read element. Alternatively, each transducer may be an inductive head having a combined read/write element or separate read and write elements, or an optical head having separate or combined read and write elements. The actuator assembly 37 includes a coil assembly 36 which cooperates with a permanent magnet structure 38 to operate as an actuator voice coil motor (VCM) 39 responsive to control signals produced by a controller 58. The controller 58 preferably includes control circuitry that coordinates the transfer of data to and from the data storage disks 24, and cooperates with the VCM 39 to move the actuator arms 30 and suspensions 28, to position transducers 27 to prescribed track 50 and sector 52 locations when reading and writing data from and to the data storage disks 24.

The Disk Substrate

Figure 3:
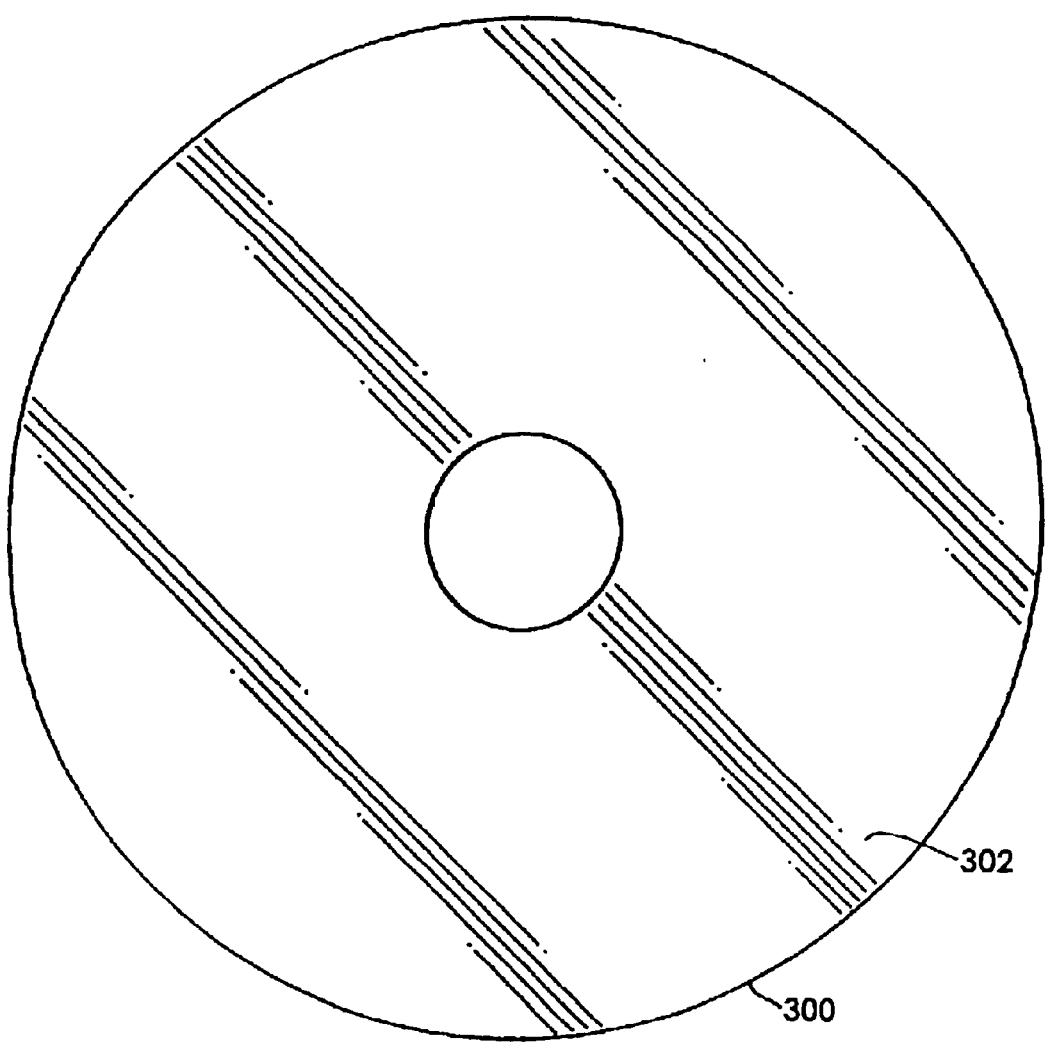
FIG. 3 is a perspective view of a disk substrate that has been microetched with a pH adjusted melt in accordance with the present invention.

FIG. 3 shows a disk substrate that has been microetched using a pH adjusted melt in accordance with the preferred embodiment of the present invention. Disk substrate 300, which has a disk substrate surface 302, is preferably a material having a relatively high specific stiffness (e.g., $\geq 3.8$ Mpsi/gm/cc) such as a glass or glass-ceramic. More preferably, the disk substrate 300 is an aluminosilicate glass. A common substrate material, e.g., aluminosilicate glass, has been chosen for the preferred embodiment to best illustrate the teachings of the present invention. However, it should be understood that the present invention is not limited to just aluminosilicate glass. Other glass-based substrate materials including other types of glass, such as silica soda lime glass, and glass-ceramics may be used. These glass-based substrates are hereinafter referred to as glass substrates.

A representative list of compositions along with their relative specific stiffnesses (Mpsi/gm/cc) that may be used is found in Table 1 below.

TABLE 1

| Specific Material | Stiffness |
|---|---|
| Aluminosilicate glass | 4.9 |
| Lithium silicate glass | 5.2 |
| Canasite glass ceramic | 4.6 |
| Flint glass ceramic | 6.6 |
| Quartz glass | 4.9–6.1 |

These materials may be used alone or in combination to provide the disk substrate of the appropriate stiffness. Preferably, the disk substrate has a stiffness of at least about 3.8 Mpsi/gm/cc.

Glass is generally a silicate material having a structure of silicon and oxygen where the silicon atom is tetrahedrally coordinated to surrounding oxygen atoms. Any number of materials may be used to form glass such as boron oxide, silicon oxide, germanium oxide, aluminum oxide, phosphorous oxide, vanadium oxide, arsenic oxide, antimony oxide, zirconium oxide, titanium oxide, aluminum oxide, thorium oxide, beryllium oxide, cadmium oxide, scandium oxide, lanthanum oxide, yttrium oxide, tin oxide, gallium oxide, indium oxide, lead oxide, magnesium oxide, lithium oxide, zinc oxide, barium oxide, calcium oxide, strontium oxide, sodium oxide, cadmium oxide, potassium oxide, rubidium oxide, mercury oxide, and cesium oxide.

Glass-ceramics may also be used for the disk substrate. Glass-ceramics generally result from the melt formation of glass and ceramic materials by conventional glass manufacturing techniques. Subsequently, the materials are heat cycled to cause crystallization. Typical glass-ceramics are, for example, β-quartz solid solution, $SiO_2$; β-quartz; lithium metasilicate, $Li_2O$—$SiO_2$; lithium disilicate, $Li_2(SiO_2)_2$; β-spodumene solid solution; anatase, $TiO_2$; β-spodumene solid solution; rutile $TiO_2$; β-spodumene solid solution; mullite, $3Al_2O_3$—$2SiO_2$; β-spodumene dorierite, $2MgO$—$2Al_2O_3$—$5SiO_2$; spinel, $MgO$—$Al_2O_3$; MgO-stuffed; β-quartz; quartz; $SiO_2$; alpha-quartz solid solution, $SiO_2$; spinel, $MgO$—$Al_2O_3$; enstatite, $MgO$—$SiO_2$; fluorphlogopite solid solution, $KMg_3AlSi_3O_{10}F_2$; mullite, $3Al_2O_3$—$2SiO_2$; and $(Ba, Sr, Pb)Nb_2O_6$.

The disk substrate may be made entirely of one material, or may include a coating layer applied over at least one surface of an inner core.

Also, it should be understood that the present invention is not limited to disk substrates. The present invention is equally applicable to other applications that involve microetching a glass substrate. For example, the present invention may be utilized in applications such as lens fabrication and mirror fabrication.

Polishing/Superfinishing and Cleaning the Disk Substrate

Just as with aluminum-based substrates, the surface of the glass substrate needs to be polished and superfinished with a slurry to provide an atomically smooth surface. Such a conventional superfinishing polish process and slurry is described in U.S. Pat. No. 6,236,542 to Hartog et al. Typically, the glass substrate is superfinished to a smooth finish with a colloidal slurry, e.g., a pH adjusted aqueous slurry containing colloidal silica and/or colloidal alumina particles and an etching agent such as cerium sulfate, prior to strengthening in a strengthening melt and then sputtering with thin film magnetic coatings.

In this conventional superfinishing polish process colloidal silica particles attach to the surface being polished not only by the usual London dispersion forces, van der Waals forces and hydrogen bonding, but unlike NiP, also by molecular bonding even though the slurry has the usual stabilizing agents used in the colloidal silica to prevent the silica particles from sticking to each other (interparticle siloxane bonding), charge repulsion and/or steric stabilizers. Standard methods of scrubbing with soaps using polyvinyl alcohol (PVA) pads, ultrasonics or megasonics will not remove any significant percentage of such molecular bonded silica particles. Just as with aluminum-based substrates, if these particles are left in place on the glass substrate, glide defects occur that can ultimately cause disk drive failure. These glide defects further cause magnetic defects, corrosion and decreased disk life.

A less-than-optimal solution to this problem is to use stronger acid or base solutions than the cleaning soap, to etch the glass substrate or undercut the slurry particles similar to what can be done to remove hard alpha alumina from Al/Mg—NiP substrates after non-superfinish polish slurries. However, the surface finish of glass substrates can be damaged by such a technique through surface topography change such as pitting and chemical composition changes. Glass has low resistance to acid etching and overly aggressive acid solutions, such as hydrofluoric acid, and caustic etching at high pH's and temperatures. The damage to the superfinished glass surface may be sufficient enough to adversely affect the morphology of layers deposited by subsequent sputtering processes and can cause magnetic, glide and corrosion failures.

A better solution to this problem is to use a cleaning polish etch solution/process (a process performed by running disk substrates on a polishing pad using an etch solution instead of a slurry, i.e., there are no slurry particles in the cleaning polish etch solution) with acid, neutral or base solutions to etch the glass substrate and/or the attached slurry particles under polish conditions thereby maintaining the superfinish surface while removing the superfinish polish slurry debris by etching and dilution. Such a cleaning polish etch solution/process is disclosed in the copending application Ser. No. 09/976,412 entitled "CLEANING POLISH ETCH COMPOSITION AND PROCESS FOR A SUPERFINISHED SURFACE OF A SUBSTRATE", assigned to the same assignee as the present application. Etching by itself (i.e., the first solution discussed above) with PVA scrub, ultrasonics or megasonics is what has been done to remove slurry particles from Al/Mg—NiP or glass substrates, but with the less than 20 nm glide heights now in use, a cleaning polish etch solution/process ensures 100% surface cleaning of particles that small (i.e., the lower the glide height, the smaller the particles needing to be removed, and thus the more difficult they are to remove) while maintaining the surface finish. The cleaning polish etch process, however, adds equipment and handling costs. Nonetheless, without the cleaning polish etch process the surface of the glass substrate can be damaged by using only chemical etch due to the low resistance of the glass material to acid etching or overly aggressive caustic etch solutions.

An even better solution to this problem is to use a self-cleaning colloidal slurry and process, such as disclosed in the copending application Ser. No. 09/976,167 entitled "SELF-CLEANING COLLOIDAL SLURRY COMPOSITION AND PROCESS FOR FINISHING A SURFACE OF A SUBSTRATE", assigned to the same assignee as the present application. The slurry comprises a carrying fluid, colloidal particles, etchant, and a surfactant adsorbed and/or precipitated onto a surface of the colloidal particles and/or substrate. The surfactant has a hydrophobic section that forms a steric hindrance barrier and substantially prevents contaminates, including colloidal particles, from bonding to the substrate surface. Subsequent cleaning with standard soap solutions removes substantially all remaining contamination from the substrate surface.

Any conventional polishing and/or superfinishing processes and slurry particle removal techniques may be used to prepare the glass substrate for immersion in the pH adjusted melt (and/or subsequent to immersion in the pH adjusted melt), and the present invention is neither limited to the superfinishing processes and cleaning techniques discussed above nor the sequence of those methods and techniques relative to immersion of the glass substrate in the pH adjusted melt.

Treatment of the Disk Substrate in the pH Adjusted Melt

The present invention utilizes a base to adjust the pH of a strengthening melt to provide an adjusted melt for use in microetching glass substrates, such as glass disk substrates for use in data storage devices. Strengthening melts are typically nitrates such as potassium nitrate ($KNO_3$) and/or sodium nitrate ($NaNO_3$). However, other strengthening melts may be used in lieu of, or in addition to $KNO_3$ and/or $NaNO_3$. Examples of strengthening melts that may be used consistent with the present invention include $KNO_3$, $NaNO_3$, $AgNO_3$, $K_2Cr_2O_7$, $Na_2Cr_2O_7$, and the like, and combinations thereof.

An appropriate amount of a base is added to the strengthening melt to raise the pH of the adjusted melt to within a predetermined pH range. The predetermined pH range is selected so that the adjusted melt will slightly etch the surface of a glass substrate immersed therein. A slight etching of the surface of a glass substrate, i.e., microetching, improves the performance and durability of a data storage disk made from the glass substrate. For glass disk substrates, it is generally preferred that the microetching produce an overall surface microroughness ($R_q$) within the range of about 5 Å to about 7 Å.

The microetching process of the present invention generates desirable surface roughness that enhances the aerodynamics and adhesion/bonding of layers (e.g., a recording layer) subsequently deposited on the glass substrate. The aerodynamic improvement reduces off-track pull due to radial forces acting on the head and improves head flying stability. Minor and controllable etching of the glass substrate surface occurs when the pH of the strengthening melt is within the predetermined pH range. However, when the pH of the strengthening melt is increased to beyond an upper limit of the predetermined pH range an overly aggressive etch occurs, causing undesirable damage (e.g., surface topographical change such as pitting and chemical compositional change) to the superfinished surface that may be sufficient enough to adversely affect the morphology of layers deposited by subsequent processes and can cause magnetic, glide and corrosion failures.

For microetching silicate glass, for example, the predetermined pH range of the adjusted melt typically includes values above and below 10. More particularly, the predetermined pH range for microetching silicate glass is preferably 9 to 11, and more preferably 9.5 to 10.5. The base is preferably added while the strengthening melt is in a molten state and is preferably selected to avoid particle formation when added to the strengthening melt. Sodium or potassium hydroxide, for example, is non-particle-forming with respect to nitrate based strengthening melts such as potassium nitrate and/or sodium nitrate. Other bases may be used in lieu of, or in addition to sodium and potassium hydroxide. Useful non-particle-forming bases generally include inorganic bases such as lithium hydroxide, sodium hydroxide, potassium hydroxide, calcium hydroxide, magnesium hydroxide, silver (I) oxide, and combinations thereof. In any event, the base is preferably selected to avoid particle formation in the strengthening melt.

Preferably, the glass substrate is immersed in the adjusted melt for a time sufficient to provide a desired degree of microetch (e.g., about 1 to 24 or more hours for silicate glass) while the temperature of the adjusted melt is maintained below the strain point, or transformation temperature, of the glass (e.g., about 280° C. to 420° C. for silicate glass in molten potassium nitrate and/or sodium nitrate). More preferably, the glass substrate is aluminosilicate, the adjusted melt has a pH of about 10, and the glass substrate is immersed in the adjusted melt for about 2 to 4 hours while the temperature is maintained at about 360° C. This single immersion operation both strengthens and microetches the glass substrate, without additional process steps and safety concerns. A slight etching of the surface of a glass substrate, i.e., microetching, improves the performance and durability of a data storage disk made from the glass substrate. Microetching typically adds aerodynamic stability to the head/disk interface, reducing slider modulation and head crashes, and improves off-track error rate. To avoid an overly aggressive etch that can create undesirable damage to the substrate surface, an acid (e.g., nitric acid) may be added to the adjusted melt if the pH is subsequently determined to have shifted to above an upper limit (e.g., an upper pH limit of about 11 for silicate glass).

Strengthening melts are subject to pH shift that can cause glass substrates strengthened therein to aggressively etch, creating angstrom to nanometer size pits on the surface of the glass substrates. The pH shift can come from sources such as the thermal decomposition of the strengthening melt, the glass substrates themselves (typically, alkali glass), and/or incoming salts with high pH. Typically, the pH shift worsens with repeated use of the strengthening melt to treat more and more glass substrates.

An appropriate amount of an acid may be added if the pH of the adjusted melt rises above a predetermined upper pH limit. The upper pH limit is selected so that the acid will neutralize the salt bath and substantially eliminate aggressive etching. For microetching silicate glass, for example, the upper pH limit is preferably 11, and more preferably 10.5. In addition to pH shift, it may be necessary to add an acid to the adjusted melt if too much base is added. The acid is preferably added while the adjusted melt is in a molten state and preferably selected to avoid particle formation when added to the adjusted melt. Nitric acid, for example, is non-particle-forming with respect to nitrate based melts such as potassium nitrate and/or sodium nitrate. The present invention is not limited to the use of nitric acid as the non-particle-forming acid, however. Other non-particle-forming acids may be used in lieu of, or in addition to nitric acid. Useful non-particle-forming acids generally include acids such as nitric acid and chromic acid, and combinations thereof. In any event, the acid is preferably selected to avoid particle formation when added to the adjusted melt.

For nitrate-based molten salt baths, an advantage to using nitric acid ($HNO_3$) as the non-particle-forming acid and potassium hydroxide (KOH) and/or sodium hydroxide (NaOH) as the non-particle-forming base is that the neutralization products are potassium nitrate ($KNO_3$) and sodium nitrate ($NaNO_3$), which are typically constituents in the molten salt bath. Similarly, for dichromate-based molten salt baths, an advantage to using chromic acid ($CrO_3$) as the non-particle-forming acid and potassium hydroxide (KOH) and/or sodium hydroxide (NaOH) as the non-particle-forming base is that the neutralization products are potassium dichromate ($K_2Cr_2O_7$) and sodium dichromate ($Na_2Cr_2O_7$), which are typically constituents in the molten salt bath. Also, any other alkali species in the molten salt bath will be neutralized into ionic nitrate or dichromate compounds, which typically comprise 100% of the molten salt bath. The neutralization products are generally classic acid/base salts—in this particular case, nitrated ionic or dichromated ionic compounds.

The appropriate amount of acid or base to be added to the melt is preferably determined based on the pH of the melt. Preferably, the appropriate amount of acid or base is added to maintain the pH of the melt in a predetermined pH range—which for silicate glass is preferably 9 to 11, and more preferably 9.5 to 10.5.

The pH of the melt may be determined using conventional techniques. Because the melt is not an aqueous environment, its pH is typically not directly measured using a pH meter, for example. Instead, the pH of the melt may be determined using other conventional techniques such as by an indirect measure of the caustic material (e.g., sodium oxide, lithium oxide, potassium oxide and the like leached from the glass substrate) in the melt by titration against a reagent of known molarity. Such conventional techniques of pH determination are well known in the art, and thus are not further discussed herein.

Given the molten state of the melt as the acid or base is added, the addition preferably occurs slowly and near the bottom of the melt. For example, a metering pump may be used to control the rate at which the acid or base is added to the melt through a dispersive discharge positioned at the bottom of the melt vessel.

The ability to raise the pH of the melt was demonstrated by adding 10 gm of sodium hydroxide (NaOH) to a melt comprised of a 30 pound molten salt mixture (approximately 60/40) of potassium nitrate ($KNO_3$) and sodium nitrate ($NaNO_3$). In this case, the melt was at an initial pH of 8.77 and was raised to a pH of 10.5.

The ability to lower the pH of the melt was also demonstrated by adding 5.0 ml of nitric acid ($HNO_3$) to a melt comprised of a 30 pound molten salt mixture (approximately 60/40) of potassium nitrate ($KNO_3$) and sodium nitrate ($NaNO_3$). In this case, the melt was at an initial pH of 9.1 and was lowered to a pH of 6.5.

The pH of the melt may be determined on a periodic basis (e.g., after a predetermined number of glass substrates have been processed and/or after a predetermined period of time the melt has been heated), or after a specific event (e.g., after a temperature excursion and/or after material is added to the melt).

Alternatively, the appropriate amount of acid or base to be added to the melt may be determined without actual determination of the pH of the melt. For example, the pH of the melt may be estimated (without an actual determination) based on process history criteria such as the number of glass substrates that have been processed and/or the period of time the melt has been heated.

When the melt is adjusted within the predetermined pH range, the degree of etching may be controlled by the temperature of the adjusted melt and/or the duration of immersion. Silicate glass disk substrates, for example, are preferably immersed in the pH adjusted melt for 1 to 24 or more hours while the temperature is maintained at about 280° C. to 420° C., more preferably about 2 to 4 hours while the temperature is maintained at about 360° C. The surface etch of glass disk substrates treated in the pH adjusted melt was uniform and free from high spots or peaks as seen by atomic force microscope (AFM).

EXAMPLE

Sodium hydroxide (NaOH) was added to a conventional strengthening melt comprised of a 30 pound molten salt bath mixture of 60% potassium nitrate ($KNO_3$) and 40% sodium nitrate ($NaNO_3$) to increase the pH from an initial pH of 7.0 to an adjusted pH of 10.2. About 10 gm of sodium hydroxide was added. Superfinished aluminosilicate glass disk substrates were treated in both the conventional strengthening melt (pH=7.0) and the pH adjusted melt (pH=10.2) at 360° C. for 3 hours. Superfinished aluminosilicate glass disk substrates treated in the conventional strengthening melt (pH=7.0) strengthening melt were strengthened, but not microetched. In contrast, superfinished aluminosilicate glass disk substrates treated in the pH adjusted melt (pH=10.2) were both strengthened and microetched. The surface microetch was uniform and free from high spots or peaks as seen by atomic force microscope (AFM). Aluminosilicate glass disk substrates strengthened and microetched in the pH adjusted melt (pH=10.2) had surface roughness parameters of $R_q/R_p/R_{max}$ of 5.23 Å/28 Å/45 Å. Aluminosilicate glass disk substrates strengthened in the conventional strengthening melt (pH=7.0) had surface roughness parameters of $R_q/R_p/R_{max}$ of 3.94 Å/21 Å/54 Å. A data storage disk having improved performance and durability can be provided by applying a recording layer over the microetched surface of the aluminosilicate glass disk substrate treated with the pH adjusted melt (pH=10.2) as compared to the conventional strengthening melt (pH=7.0).

While this invention has been described with respect to the preferred and alternative embodiments, it will be understood by those skilled in the art that various changes in detail may be made therein without departing from the spirit, scope, and teaching of the invention. For example, the invention may be utilized in other data storage medium applications, such as in optical storage medium applications. Additionally, the invention may be utilized in applications other than data storage device applications, such as in lens fabrication applications, mirror fabrication applications or other applications that involve microetching a glass substrate. Accordingly, the herein disclosed invention is to be limited only as specified in the following claims.

What is claimed is:

1. A method of microetching glass disk substrates for use in storage devices, comprising the steps of:

providing a strengthening melt;

providing an adjusted melt by adding a base to the strengthening melt such that the pH of the adjusted melt is sufficient for microetching a selected glass composition;

placing a glass disk substrate having the selected glass composition in the adjusted melt.

2. The method as recited in claim 1, wherein the strengthening melt comprises at least one of potassium nitrate, sodium nitrate, silver nitrate, potassium dichromate and sodium dichromate; and wherein the base comprises at least one of sodium hydroxide, potassium hydroxide, calcium hydroxide, magnesium hydroxide, lithium hydroxide and silver (I) oxide.

3. The method as recited in claim 2, wherein the strengthening melt comprises at least one of potassium nitrate and sodium nitrate; and wherein the base comprises at least one of sodium hydroxide and potassium hydroxide.

4. The method as recited in claim 3, wherein the glass disk substrate is an aluminosilicate glass disk substrate, the pH of the adjusted melt is no less than about 10, the temperature of the adjusted melt is about 360° C., and the aluminosilicate glass disk substrate is placed in the adjusted melt for between about 2 and 4 hours.

5. The method as recited in claim 1, wherein the glass disk substrate is a silicate glass disk substrate, and further comprising the steps of:

determining the pH of the adjusted melt;

adding an acid to the adjusted melt if the pH is determined to be above about 11.

6. The method as recited in claim 5, wherein the strengthening melt comprises at least one of potassium nitrate, sodium nitrate, silver nitrate, potassium dichromate and sodium dichromate; and wherein the base comprises at least one of sodium hydroxide, potassium hydroxide, calcium hydroxide, magnesium hydroxide, lithium hydroxide and silver (I) oxide.

7. The method as recited in claim 6, wherein the acid comprises at least one of nitric acid and chromic acid.

8. The method as recited in claim 5, wherein the glass disk substrate is a silicate glass disk substrate, and wherein the step of determining the pH and, if necessary, the step of adding the acid, is repeated to maintain the adjusted melt at a pH no higher than about 11.

9. The method as recited in claim 1, wherein the glass disk substrate is a silicate glass disk substrate, the temperature of the adjusted melt is high enough for the adjusted melt to be a liquid but lower than the strain point of the silicate glass disk substrate, and the silicate glass disk substrate is placed in the adjusted melt for at least 1 hour.

10. The method as recited in claim 1, wherein the glass disk substrate is an aluminosilicate glass disk substrate, the temperature of the adjusted melt is about 360° C., and the aluminosilicate glass disk substrate is placed in the adjusted melt for between about 2 and 4 hours.

11. A glass disk substrate microetched using the method according to claim 1, wherein the microetched glass disk substrate has an overall surface microroughness ($R_q$) within a range of about 5 Å to about 7 Å.

12. A method of adjusting the pH of a strengthening melt to provide an adjusted melt for use in microetching glass substrates, comprising the steps of:

providing a strengthening melt;

providing an adjusted melt by adding a base to the strengthening melt such that the pH of the adjusted melt is sufficient for microetching a glass substrate having a selected glass composition.

13. The method as recited in claim 12, wherein the strengthening melt comprises at least one of potassium nitrate, sodium nitrate, silver nitrate, potassium dichromate and sodium dichromate; and wherein the base comprises at least one of sodium hydroxide, potassium hydroxide, calcium hydroxide, magnesium hydroxide, lithium hydroxide and silver (I) oxide.

14. The method as recited in claim 13, wherein the glass substrate is a silicate glass substrate and the pH of the adjusted melt is no less than about 10.

15. The method as recited in claim 12, wherein the glass substrate is a silicate glass substrate, and further comprising the steps of:

determining the pH of the adjusted melt;

adding an acid to the adjusted melt if the pH is determined to be above about 11.

16. The method as recited in claim 15, wherein the strengthening melt comprises at least one of potassium nitrate, sodium nitrate, silver nitrate, potassium dichromate and sodium dichromate; and wherein the base comprises at least one of sodium hydroxide, potassium hydroxide, calcium hydroxide, magnesium hydroxide, lithium hydroxide and silver (I) oxide.

17. The method as recited in claim 16, wherein the acid comprises at least one of nitric acid and chromic acid.

18. A method of microetching glass substrates, comprising the steps of:

providing a strengthening melt;

providing an adjusted melt by adding a base to the strengthening melt such that the pH of the adjusted melt is sufficient for microetching a selected glass composition;

placing a glass substrate having the selected glass composition in the adjusted melt.

19. The method as recited in claim 18, wherein the strengthening melt comprises at least one of potassium nitrate, sodium nitrate, silver nitrate, potassium dichromate and sodium dichromate; and wherein the base comprises at least one of sodium hydroxide, potassium hydroxide, calcium hydroxide, magnesium hydroxide, lithium hydroxide and silver (I) oxide.

20. The method as recited in claim 19, wherein the glass substrate is a silicate glass substrate, the temperature of the adjusted melt is high enough for the adjusted melt to be a liquid but lower than the strain point of the silicate glass disk substrate, and the silicate glass substrate is placed in the adjusted melt for at least 1 hour.

* * * * *